United States Patent
Stratten et al.

(10) Patent No.: US 8,991,544 B1
(45) Date of Patent: Mar. 31, 2015

(54) PASSIVELY DEPLOYED SMALL OVERLAP RIGID BARRIER DEFLECTOR

(71) Applicant: Ford Global Technologies, LLC, Dearborn, MI (US)

(72) Inventors: Eric Layton Stratten, Plymouth, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/101,650

(22) Filed: Dec. 10, 2013

(51) Int. Cl.
*B60T 7/22* (2006.01)
*B60R 19/16* (2006.01)

(52) U.S. Cl.
CPC ....................................... *B60R 19/16* (2013.01)
USPC ............ 180/274; 280/784; 293/114; 293/115

(58) Field of Classification Search
CPC ........ B60R 19/16; B60R 19/02; B60R 19/00; B60R 2021/0023; B62D 21/15; B62D 21/151
USPC ........... 180/274; 280/784; 293/102, 115, 128, 293/58, 114; 296/180.1, 180.5
See application file for complete search history.

(56) References Cited

U.S. PATENT DOCUMENTS

| | | | | |
|---|---|---|---|---|
| 3,472,332 A | * | 10/1969 | Halvajian | 180/276 |
| 3,836,189 A | * | 9/1974 | Borrelli | 294/3.6 |
| 4,234,222 A | * | 11/1980 | Bays | 293/124 |
| 4,674,933 A | * | 6/1987 | Brown | 414/24.6 |
| 5,213,383 A | * | 5/1993 | Muselli et al. | 293/2 |
| 5,688,006 A | * | 11/1997 | Bladow et al. | 293/120 |
| 5,975,599 A | * | 11/1999 | Goldstein | 293/128 |
| 6,135,252 A | * | 10/2000 | Knotts | 188/374 |
| 6,682,111 B1 | * | 1/2004 | Houseman et al. | 293/115 |
| 6,926,322 B2 | * | 8/2005 | Browne et al. | 293/114 |
| 6,942,262 B2 | * | 9/2005 | Glasgow et al. | 293/132 |
| 7,478,849 B2 | * | 1/2009 | Fortin | 293/120 |
| 7,819,218 B2 | | 10/2010 | Eichberger et al. | |
| 7,926,847 B2 | | 4/2011 | Auer et al. | |
| 2010/0140965 A1 | * | 6/2010 | Schoenberger et al. | 293/118 |
| 2012/0286528 A1 | * | 11/2012 | Barron | 293/58 |
| 2014/0097627 A1 | * | 4/2014 | Barron | 293/58 |

FOREIGN PATENT DOCUMENTS

EP 2543572 A1 5/2011
JP 2012228906 A 11/2012

OTHER PUBLICATIONS

Wang, J.T., "An Extendable and Retractable Bumper", General Motors Corporation, United States Paper No. 05-0144.

* cited by examiner

*Primary Examiner* — Ruth Ilan
*Assistant Examiner* — Darlene P Condra
(74) *Attorney, Agent, or Firm* — Raymond L. Coppiellie; Brooks Kushman P.C.

(57) ABSTRACT

A front bumper assembly including a bumper beam and two deflectors are provided on right and left sides of the front bumper assembly. The deflectors include hook-shaped portions and telescopic portions. The telescopic portions are received within the front bumper assembly. The hook-shaped portion of the deflector may be engaged by a rigid barrier aligned with the deflectors. In the event of a collision, the rigid barrier engages one of the hook-shaped portions and withdraws the telescopic portion from the front bumper assembly. The deflector is pulsed outwardly to move the front wheel and tire assembly to a tow-in orientation.

18 Claims, 3 Drawing Sheets

PASSIVELY DEPLOYED SMALL OVERLAP RIGID BARRIER DEFLECTOR

TECHNICAL FIELD

This disclosure relates to a bumper mounted apparatus for reducing intrusions into a passenger compartment of a vehicle as tested in a small overlap rigid barrier test.

BACKGROUND

Land vehicles are tested for crashworthiness by a variety of tests including frontal impacts, side impacts, rear impacts, roll-over and other tests. Full frontal impact tests were previously developed that specified that a vehicle impacts a barrier between the frame rails that extend longitudinally relative to the vehicle. In a full frontal impact test, the frame rails provided the primary support for the vehicle body.

A test promulgated by the Insurance Institute for Highway Safety (IIHS) simulates small overlap frontal crashes against a rigid barrier. In the proposed test, the vehicle impacts a rigid barrier having a six inch pole-like radius on one corner with a 25% overlap at 40 MPH. The impact is outboard of the frame rails and the frame rails do not provide as much resistance to intrusion into the passenger compartment as in the case of impacts between the frame rails. The extent of any intrusions into the passenger compartment are measured at the lower hinge pillar, rocker panel, footrest, left toe pan, brake pedal, parking brake pedal, steering column, upper hinge pillar, upper dash, and left instrument panel.

Deflectors that are attached to the outer end of a vehicle bumper have been tested and have reduced intrusions into the passenger compartment. One problem with adding deflectors to a vehicle is that the deflectors may interfere with the performance of impact absorption systems such as crush-cans that are used to minimize the effects of a full-frontal impact. In the case of impacts in between the frame rails, crush-cans and/or frame rails are designed to deform in an accordion fashion to maximize impact energy absorption. Deflectors addressing small overlap impacts can disturb the accordion deformation of crush-can/frame rail. Modifications of vehicle design to address small overlap impacts should minimize any effect on other impact modes.

Actively deployed deflectors have been proposed that include an inflation system that may be similar to an airbag inflator that inflates a collision impact absorption mechanism. Pyrotechnic actuators for an expandable sliding deflector are disclosed in U.S. Pat. No. 6,926,322 and EP 2 543 572 A1. Pivoting links with a telescopic link have also been proposed as in U.S. Pat. No. 7,819,218. Many other approaches have been proposed to address the problem of small overlap rigid barrier front end collisions.

Additional reduction of intrusions in the small overlap rigid barrier (SORB) test results are desired that further reduce intrusions and that are simple, robust and cost effective.

This disclosure is directed to solving the above problems and other problems as summarized below.

SUMMARY

According to one aspect of this disclosure, a small overlap collision deflector apparatus is provided for a vehicle comprising a beam and a telescopic deflector. The beam defines a transverse channel that receives the deflector. The deflector has a telescopic portion that is received in the channel. A hook-shaped portion of the deflector extends outwardly and rearward from the channel. The hook-shaped portion defines a recess that is open in a forward direction. An impact with a rigid barrier aligned with the hook-shaped portion is self-actuating to pull the telescopic portion from the channel in a collision.

According to another aspect of this disclosure, the beam may be a B-shaped cross-section bumper and the transverse channel may include a lower section and an upper section. Two deflectors may be provided with a first deflector being received in the lower section and a second deflector being received in the upper section. The first hook-shaped portion extends from a right side of the beam and the second hook-shaped portion extends from a left side of the beam. The hook-shaped portion may define a recess that is disposed rearward of a front surface of the beam.

The beam may be a bumper of the vehicle and may be disposed on the vehicle in front of a front wheel on each side of the vehicle. The transverse channel may be curved and may include an arc-shaped front wall and an arc-shaped rear wall. Alternatively, the transverse channel may extend in a lateral direction and in a rearward direction away from a centerline of the vehicle.

The rigid barrier may pull the hook-shaped portion outboard of a wheel and tire assembly and may be effective to move the wheel and tire assembly to a toe-in position. The telescopic portion of the deflector may be deformed as the telescopic portion is pulled from the channel and may partially absorb energy from a collision force.

According to another aspect of this disclosure, an assembly is disclosed that comprises a beam defining at least one internal tubular cavity. A first elongated member may be received in a right side of the beam, and a second elongated member may be received in a left side of the beam. A right hook-shaped end is provided on the first elongated member that extends from a right side of the beam, and a left hook-shaped end is provided on the second elongated member that extends from a left side of the beam.

According to another aspect of this disclosure, an impact absorbing assembly is provided for a vehicle that comprises a bumper beam including a transversely extending tubular portion, a first side hook and a second side hook. The first side hook has a first shank portion telescopically received in a right side of the tubular portion. The second side hook has a second shank portion telescopically received in a left side of the tubular portion. In a small overlap collision with a rigid barrier, the rigid barrier is received in one of either the first side hook or the second side hook and pulls the respective shank portion from the bumper beam.

The shank portion of the one side hook may be deformed as the shank portion is pulled from the bumper beam and absorbs energy from a collision force.

The above aspects of this disclosure and other aspects are described in greater detail below with reference to the attached drawings.

BRIEF DESCRIPTION OF THE DRAWINGS

FIG. 2 is a perspective view of a front bumper assembly attached to a vehicle that is shown in a fragmentary portion.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
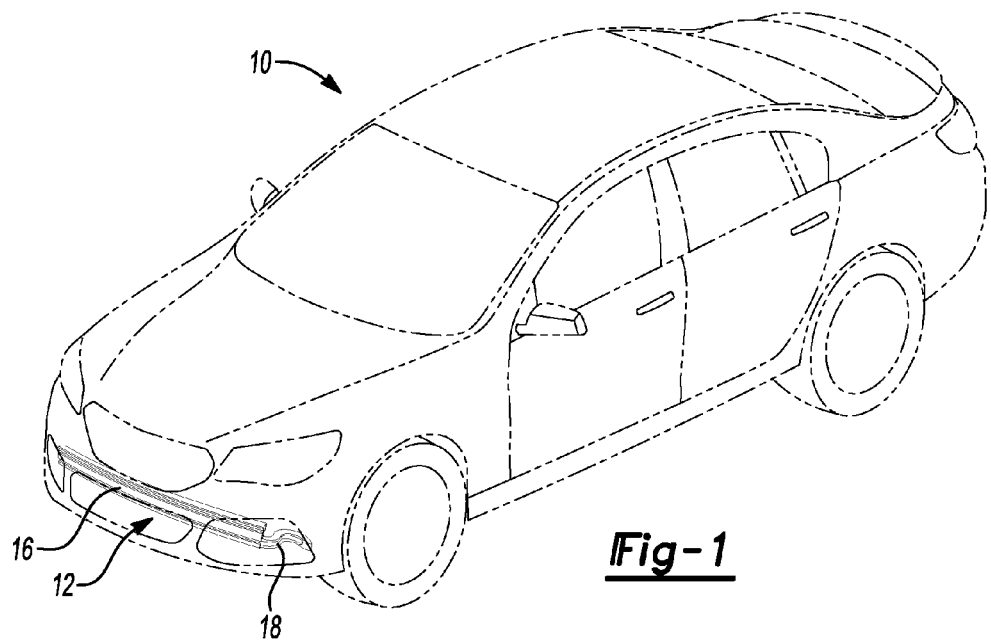
FIG. 1 is a perspective view of a vehicle shown in phantom including a front bumper assembly made according to the present invention.

FIG. 1 illustrates a vehicle 10 having a front bumper assembly 12. The front bumper assembly 12 includes a bumper beam 16 and a deflector 18 that is telescopically received within the bumper beam 16.

Figure 3:
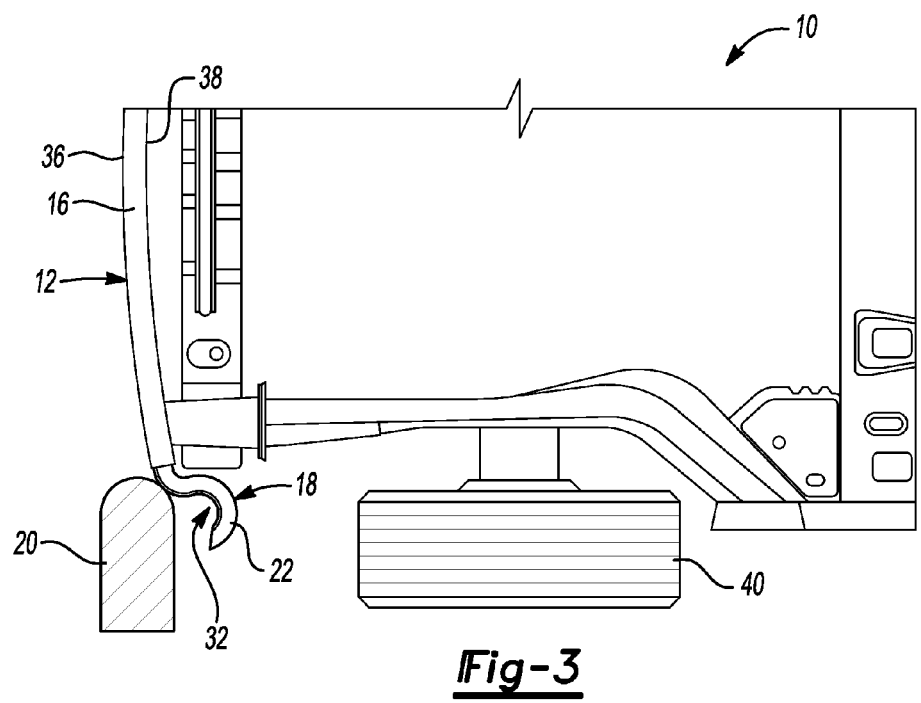
FIG. 3 is a fragmentary plan view of a front portion of the vehicle including a front bumper assembly made according to this disclosure.

Referring to FIGS. 2 and 3, a front bumper assembly 12 is illustrated that includes the bumper beam 16 and the deflector 18. A rigid barrier 20, shown in FIG. 3, is in longitudinal alignment with the deflector 18 and is shown at the moment of initial impact of the deflector 18 with the rigid barrier 20.

The deflector 18 includes a hook-shaped portion 22 and a telescopic portion 24 that is an elongated member or shank portion. The bumper beam 16 defines a transverse channel 26 that in the illustrated embodiment has a B-shaped cross-section. It should be understood that the transverse channel 26 may have a different cross-section. The transverse channel 26 as illustrated is a curved member or, in an alternative embodiment, the transverse channel 26 may extend at an angle outwardly and rearwardly from the front center of the vehicle. The transverse channel 26 when provided with a B-shaped cross section includes a lower section 28 and an upper section 30.

As shown in FIG. 2, one deflector 18 is telescopically received in the upper section 30, while another deflector 18 is received in the lower section 28. The hook-shaped portion 22 defines a recess 32. The recess 32 opens in the forward direction and functions to catch or capture the rigid barrier 20 as the vehicle moves into further engagement with the rigid barrier 20.

Figure 4:
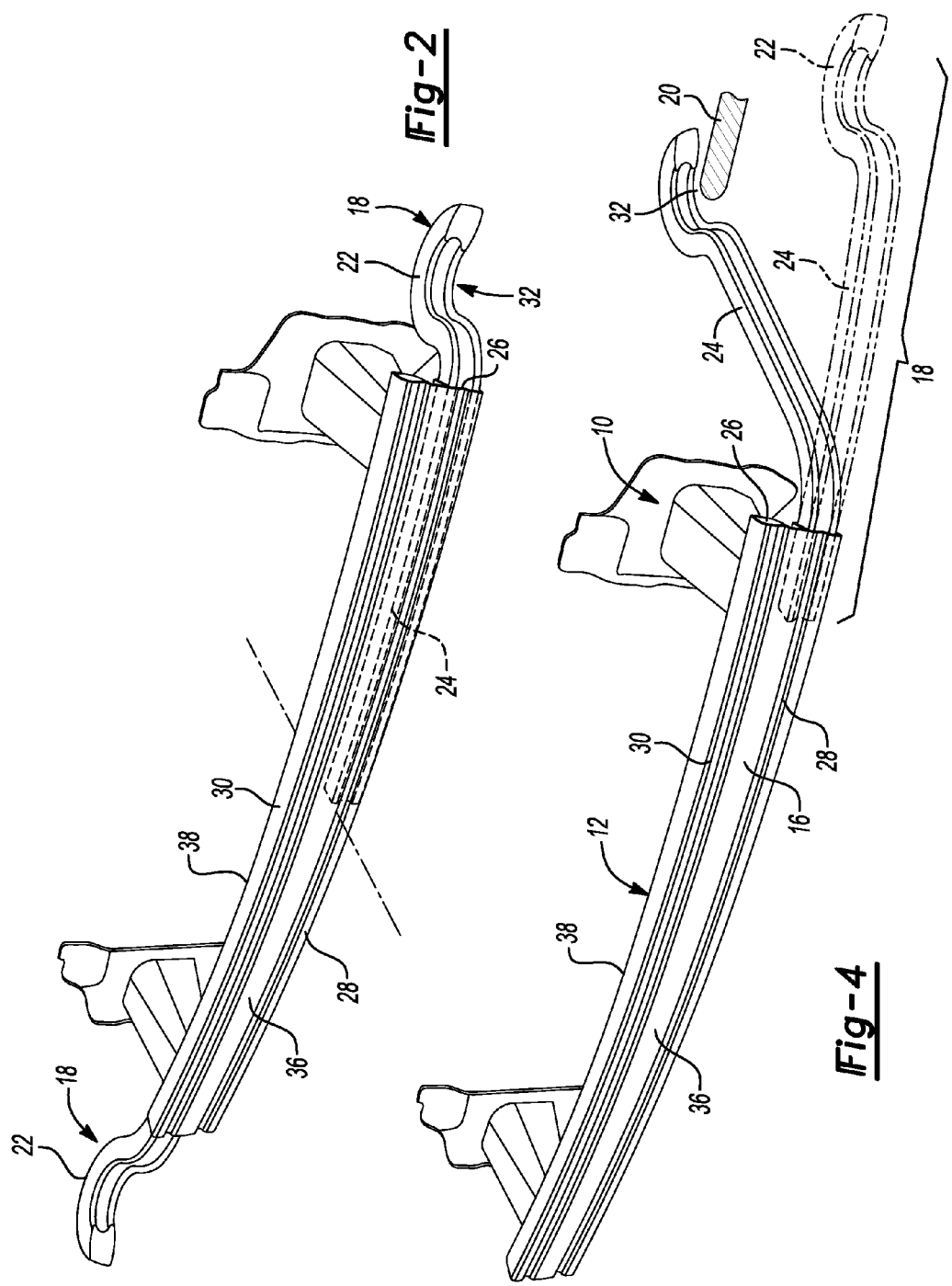
FIG. 4 is a fragmentary perspective view of a front bumper assembly after a collision with a rigid barrier.
Figure 5:
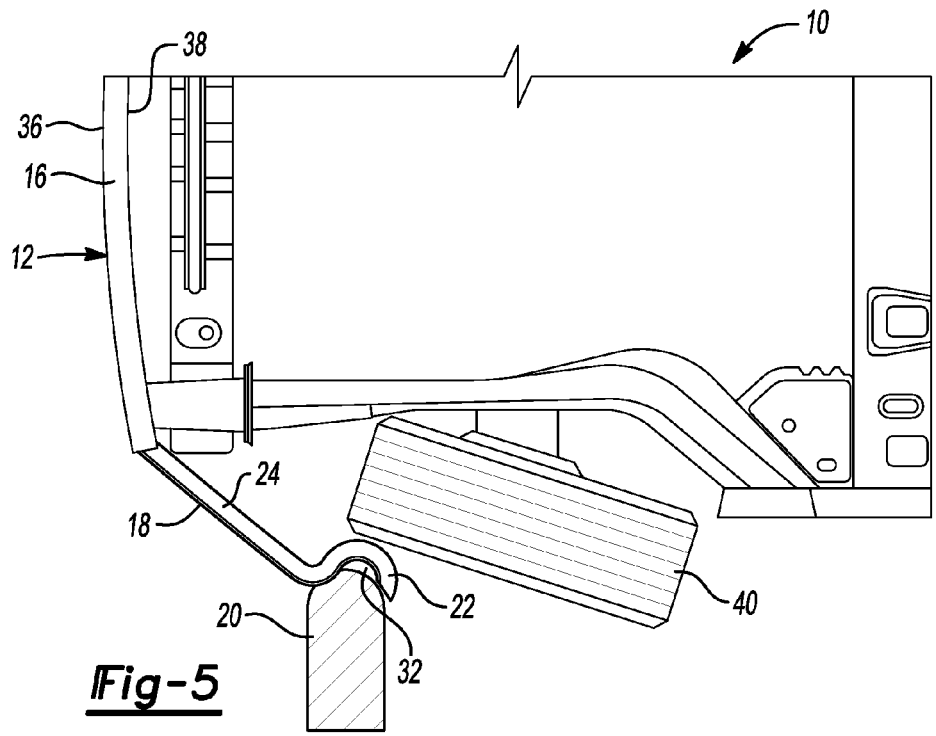
FIG. 5 is a fragmentary view of the front end of a vehicle showing the front bumper assembly with a deflector extended as a result of a collision with a rigid barrier.

Referring to FIGS. 4 and 5, the front bumper assembly 12 and vehicle 10 are shown after full engagement with the rigid barrier 20. The deflector 18 is shown in phantom lines to illustrate the shape of the deflector 18 when inserted during assembly and before deformation in a collision. The rigid barrier 20 engages the recess 32 formed by the hook-shaped section 22 in a SORB collision test. As the vehicle 10 moves past the rigid barrier 20, the hook-shaped portion 22 pulls the telescopic portion 24 out of the transverse channel 26. The telescopic portion 24 may be deformed as it is pulled from the transverse channel 26. The hook-shaped portion 22 may also be deformed by engagement with the rigid barrier 20 depending upon the dynamics of the collision.

The bumper beam 16 includes a front wall 36 and a rear wall 38. The front wall 36 and the rear wall 38 are arc-shaped in configuration in the illustrated embodiment. Alternatively, the bumper beam 16 may be straight and oriented at an angle extending outward and rearward from the central portion of the front end of the vehicle 10. As the deflector 18 is pulled by the engagement of the hook-shaped portion 22 with the rigid barrier 20, the telescopic portion 24 is pulled from the transverse channel 26. The telescopic portion 24 and hook-shaped portion 22 may be deformed as a result of the impact with the rigid barrier 20.

As shown in FIG. 5, the hook-shaped portion 22 is configured to engage the outer side of the front wheel and tire assembly 40. The hook-shaped portion 22 engages the front wheel and tire assembly 40 to cause the front wheel and tire assembly 40 to be moved into a tow-in orientation. The movement of the wheel and tire assembly 40 into a tow-in orientation reduces the likelihood and the extent of penetration into the passenger compartment of the vehicle 10. Extension of the telescopic portion 24, or shank, of the deflector 18 provides the deflector 18 with sufficient extension to engage the outer side of the front wheel and tire assembly 40.

Figure 6:
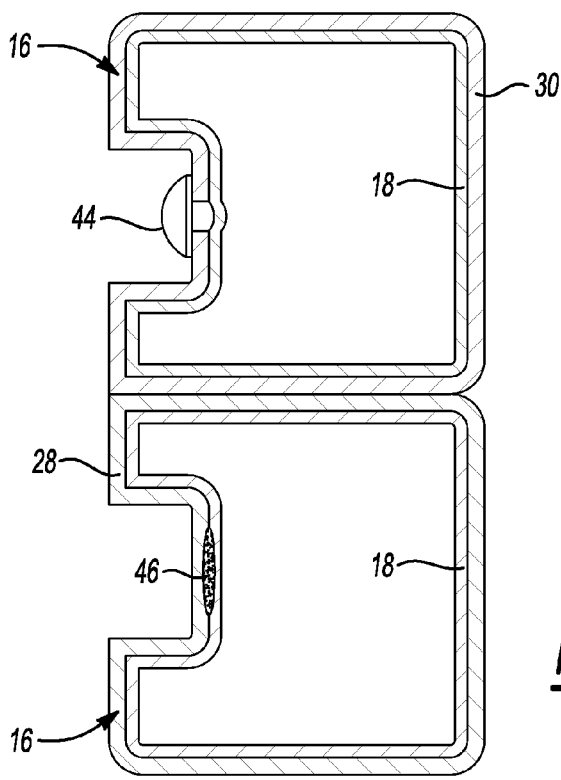
FIG. 6 is a cross-sectional view showing a bumper beam having a B-shaped cross section that is shown with two deflectors with each deflector being secured within the bumper assembly by a different way of securing the deflector within the bumper beam.

Referring to FIG. 6, a bumper beam 16 having a B-shaped cross section is shown in cross-section with two deflectors 18 retained within the bumper beam 16 by different retention mechanisms. In all likelihood, the same retention mechanisms would be used to retain the deflector 18 in both the lower section 28 and the upper section 30. In the upper section 30, a rivet or threaded fastener 44 is shown engaging the deflector 18 to hold it within the upper section 30. The fastener 44 engages the deflector 18, but does not prevent the deflector from being extracted from the bumper beam 16 in the event that the deflector 18 engages the rigid barrier 20.

The lower section 28 of the bumper beam 16 is shown with a deflector 18 being secured by a small weld 46 that holds the deflector 18 within the lower section 28 of the bumper beam 16. The weld 46 prevents the deflector 18 from separating from the bumper beam 16 except in the event of a collision with a rigid barrier 20, as shown in FIGS. 4 and 5. It should be understood that a clinch connector or other type of connector that provides a limited degree of resistance to withdrawing the deflector 18 from the bumper beam 16 may be provided so that in normal operation of the vehicle the deflectors 18 remain within the bumper beam 16. However, in the event of a collision with a rigid barrier aligned with the deflector 18, the holding force of the fastener 44, weld 46, or other connector is exceeded and the telescopic portion 24 of the deflector 18 may be extracted from the bumper beam 16, as shown in FIGS. 4 and 5.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A small overlap collision deflector apparatus for a vehicle comprising:
   a beam that defines a transverse channel; and
   a deflector having a telescopic portion received in the channel, and a hook-shaped portion extending outwardly and rearward from the channel, wherein the hook-shaped portion defines a recess that is open in a forward direction, wherein an impact with a rigid barrier aligned with the hook-shaped portion pulls the telescopic portion from the channel.

2. The apparatus of claim 1 wherein the beam is a B-shaped cross-section bumper beam and the transverse channel includes a lower section and an upper section and wherein two deflectors are provided with a first deflector being received in the lower section and a second deflector being received in the upper section, and wherein a first hook-shaped portion extends from a right side of the beam and a second hook-shaped portion extends from a left side of the beam.

3. The apparatus of claim 1 wherein the hook-shaped portion is recessed rearward of a front surface of the beam.

4. The apparatus of claim 1 wherein the beam is a bumper of the vehicle.

5. The apparatus of claim 1 wherein the beam is disposed on the vehicle in front of a front wheel on each side of the vehicle.

6. The apparatus of claim 1 wherein the transverse channel is curved and includes an arc-shaped front wall and an arc-shaped rear wall.

7. The apparatus of claim 1 wherein the transverse channel extends in a lateral direction and in a rearward direction away from a centerline of the vehicle.

8. The apparatus of claim 1 wherein the impact with the rigid barrier pulls the hook-shaped portion outboard of a wheel and tire assembly and moves the wheel and tire assembly to a toe-in position.

9. The apparatus of claim 1 wherein the telescopic portion of the deflector is deformed as the telescopic portion is pulled from the channel and partially absorbs energy from a collision force.

10. An assembly comprising:
    a beam defining a curved internal tubular cavity that includes an arc-shaped front wall and an arc-shaped rear wall;
    a first deflector including a first portion received in a right side of the beam;
    a second deflector including a second portion received in a left side of the beam;
    a right hook-shaped end provided on the first deflector, extending from a right side of the beam; and
    a left hook-shaped end provided on the second deflector, extending from a left side of the beam.

11. The assembly of claim 10 wherein the beam is a B-shaped cross-section bumper and the tubular cavity includes a lower section and an upper section and wherein the first portion is received in the lower section and the second portion is received in the upper section.

12. The assembly of claim 10 wherein the hook-shaped ends are recessed rearward of a front wall of the beam.

13. The assembly of claim 10 wherein the beam is a bumper of a vehicle.

14. The assembly of claim 10 wherein the beam is disposed on a vehicle in front of a front wheel on each side of the vehicle.

15. The assembly of claim 10 wherein the internal tubular cavity extends in a lateral direction and in a rearward direction away from a centerline of a vehicle.

16. The assembly of claim 10 wherein the impact with the rigid barrier pulls one of the hook-shaped ends outboard of a wheel and tire assembly and moves the wheel and tire assembly to a toe-in position.

17. The assembly of claim 10 wherein one of the first portion and the second portion is deformed as one of the right hook-shaped end and the left hook-shaped end pulls the respective first or second portion from the beam and partially absorbs energy from a collision force.

18. An impact absorbing assembly for a vehicle comprising:
    a bumper beam including a transversely extending tubular portion;
    a first side hook having a first shank portion telescopically received in a right side of the tubular portion; and
    a second side hook having a second shank portion telescopically received in a left side of the tubular portion, wherein in a small overlap collision with a rigid barrier, the rigid barrier is received in one of the first side hook and the second side hook and pulls the respective shank portion from the bumper beam and wherein the one side hook is deformed as the shank portion is pulled from the bumper beam and absorbs energy from a collision force.

* * * * *